March 14, 1944.  A. C. MISCH  2,344,163
SERVICE CONNECTOR
Filed July 2, 1941
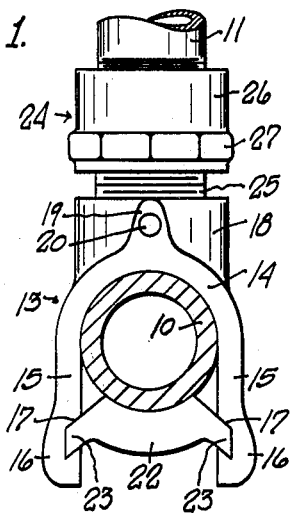
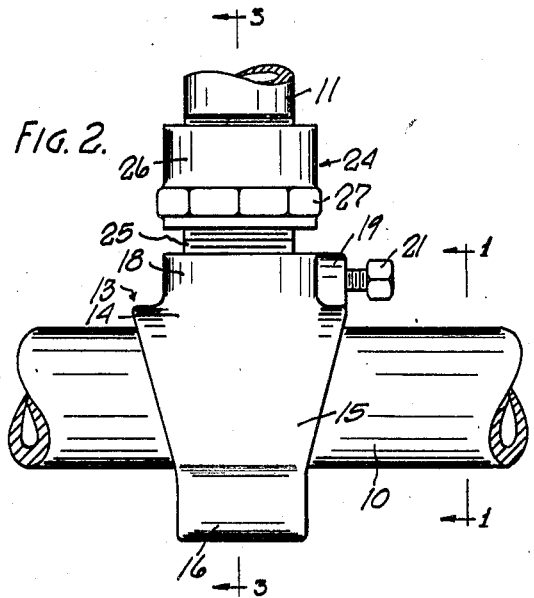
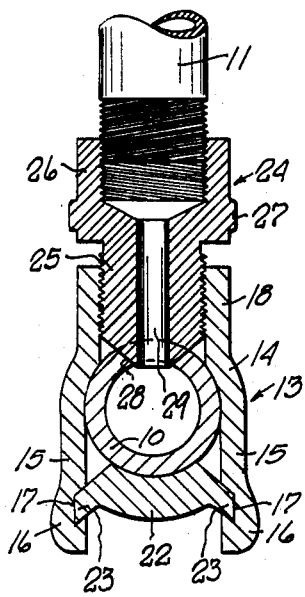
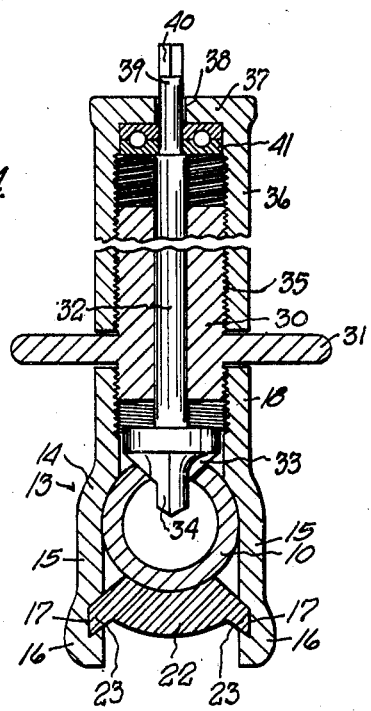
INVENTOR.
ARTHUR C. MISCH.
BY Oltsch & Knoblock
attorneys.

Patented Mar. 14, 1944

2,344,163

UNITED STATES PATENT OFFICE 2,344,163

SERVICE CONNECTOR

Arthur C. Misch, South Bend, Ind., assignor to M. B. Skinner Company, South Bend, Ind., a corporation of Indiana Application July 2, 1941, Serial No. 400,725

4 Claims. (Cl. 285—108)

This invention relates to service connectors, and more particularly to a device by means of which a branch pipe may be connected with a main.

The primary object of the invention is to provide a device which is novel and simple in construction, and which is easy to assemble and to apply to a pipe.

A further object is to provide a three piece service connector wherein application of a fitting for a branch service line to the connector serves to tighten and anchor the connector to the main line.

A further object is to provide a device of this character having a yoke adapted to straddle a main and provided with an aperture to receive a fitting for a branch line, the ends of said yoke having slots to slidably receive a locking plate diametrically opposed to the fitting, whereby the application of the fitting to the connector entails pressing thereof against the main to pull on the yoke and the locking plate and thereby effect a clamping connection of the parts on the main.

A further object is to provide a service connector between a main and a branch pipe wherein a branch pipe fitting has a firm frictional fit with the main to form a sealed connection therewith and to tighten and anchor the connector assembly on the main.

A further object is to provide a device of this character having a yoke adapted to fit around a pipe and provided with a central screw threaded opening and a removable locking member spanning the opposite ends of said yoke, said opening being adapted to receive a member which presses against the pipe and pulls on the yoke to anchor the connector to the pipe.

In the drawing:

Fig. 1 is an end elevation of the device, illustrating the main upon which it is mounted in cross section taken on line 1—1 of Fig. 2.

Fig. 2 is a side elevation of the device taken at right angles to Fig. 1.

Fig. 3 is a vertical sectional view of the device taken on line 3—3 of Fig. 2.

Fig. 4 is a sectional view similar to Fig. 3 and illustrating a pipe tapping or drilling device mounted on the connector.

Referring to the drawing, which illustrates the preferred embodiment of the invention, the numeral 10 designates a main pipe, and the numeral 11 designates a branch pipe adapted to be connected to the main. The device comprises a yoke 13 adapted to straddle the main 10 and having a concavo-convex saddle portion 14 seated on the pipe and parallel opposed plates 15 depending from saddle 14 in parallel opposed relation and spaced apart a distance slightly greater than the outer diameter of pipe 10. The lower ends of plates 15 are enlarged or thickened at 16 and have grooves 17 formed in the inner faces thereof and spaced above the lower edges. Grooves 17 extend parallel to each other and parallel to the axis of the pipe 10. A tubular projection 18 extends upwardly from the center of saddle 14. An integral projecting lug 19 is formed at one side of projection 18. A screw threaded opening 20 passes through enlargement 19 and communicates with the bore of tubular portion 18. A set screw 21 is adapted to be threaded in the aperture 20. The yoke 13 preferably constitutes a casting formed of malleable metal.

A locking plate 22, preferably of concavo-convex transverse configuration and of a length substantially equal to the length of the grooves 17, has downwardly and outwardly diverging side portions 23 of a shape complementary to the shape of the grooves 17 and adapted to fit slidably in said grooves. The concave inner faces of plate 22 has substantially the same radius as the concave inner face of yoke saddle 14, and is substantially concentric with said yoke saddle when the parts are assembled.

A tubular fitting 24 has a reduced dimension externally threaded lower portion 25 adapted for threaded engagement in the tubular portion 18 of the saddle. The upper end portion 26 of the fitting 24 is enlarged and has an internally screw threaded bore therein adapted to receive the screw threaded end of the branch pipe 11. A polygonal enlargement 27 is formed on fitting 24 between the ends thereof to provide a seat for an operating wrench. The lower end of the reduced portion 25 of the fitting 24 is tapered at 28 and is adapted to seat in a tapered opening formed in the main 10. The bore 29 in the portion 25 of fitting 24 is of a small diameter, substantially equal to the minor diameter of the tapered opening in main 10.

In the use of the device, the yoke 13 is mounted astride the main 10 at the point at which the tapered opening in the main if formed in the event such opening is preformed. The locking plate 22 is then inserted to span the ends of the legs 15 of the yoke by sliding thereof in grooves 17. The side portions 23 of the plate 22 are of a size to have a free sliding fit in the grooves 17 whereby the plate may be readily slid to place. The yoke and plate thus form an assembly encircling main 10 and loose thereon in view of the necessity of a proportion of parts to permit the plate 22 to be slid along the pipe during assembly. Then the fitting 24 is threaded into the tubular portion 18 of the yoke. When the tapered end 28 of the fitting 24 engages the tapered opening in the pipe, the same serves to press upon the pipe at the walls of said tapered pipe opening and to pull upon the yoke 13, thereby forcing the locking plate 22 into firm frictional anchoring or clamping relation to the pipe 10 in diametrically opposed relation to the fitting 24.

A number of special advantages are obtained by this construction. Thus, the formation of the connector in only three pieces involves a simplicity of construction and a reduction in the number of parts. For example, at least two securing members are usually required for securing a conventional connector upon a pipe, and those securing members are entirely separate from the parts of the connector per se. Also, the pressure applied by the device upon the pipe is equal at all points on the circumference of the tapered end portion 28 of the fitting and is applied over the large area afforded by the tapered formation of the portion 28 and the tapered pipe opening. This assures a tight seal and eliminates the necessity for lead sealing elements surrounding the tapped opening of the connector as have been required in previous devices of this character. Still another advantage of the construction resides in the fact that the fit of the tapered end 28 of the fitting 24 in the tapered opening of the pipe supplements the anchoring or clamping action or engagement of the connector with the pipe, and forms a positive means for preventing the relative movement of the connector and the pipe either in a longitudinal or in a rotative direction. Another advantage is that the set screw 21 may be employed to positively lock the fitting 24 on the connector after the fitting has been properly seated on the tapered wall of the opening in the pipe 10, so that the danger of loosening of the parts incident to vibration or other causes is eliminated and the positive sealed face engagement between tapered end 28 of the fitting and the tapered opening of the pipe is maintained.

The device may also be used upon pipes which do not have the necessary tapered opening formed therein previous to the mounting of the connector thereon. An arrangement of this type is illustrated in Fig. 4, wherein the tubular portion 18 of the yoke 13 receives and mounts the lower end of a screw threaded cylindrical member 30 having wing portions 31 by means of which the same may be rotated relative to the connector. The cylinder 30 has a small central bore therethrough in which a shaft 32 is slidable longitudinally and is rotatable. Shaft 32 may mount a combined drill and reamer comprising a tapered reaming head 33 and a central drill 34 projecting centrally from the end of the reaming head. Cylinder 30 is elongated and is externally screw threaded at 35 above the wings 31 for screw threaded connection with a tubular member 36 having an end plate 37 apertured at 38 to freely receive a reduced end portion 39 of shaft 32. The outer end 40 of shaft 32—39 is preferably squared at 40 to receive an operating wrench. An annular bearing 41 encircles shaft portion 39 and seats upon the shoulder formed between the reduced portion 39 and the major portion of shaft 32. The end plate 37 of tube 36 bears upon the upper side of bearing 41.

It will be observed that, to apply and operate, this construction the yoke 13 will be mounted upon the pipe 10 at the desired point and the locking plate 22 will then be slid to place, as previously described. Thereupon, the drilling device, comprising cylinder 30, tube 36, shaft 32, and the drilling and reaming head, will be applied to the connector as an assembly by threading the lower end of cylinder 30 in the bore of tubular portion 18 of the connector. When the cylinder 30 has been solidly mounted in said tubular portion 18 of the yoke, the tube 36 of the drilling assembly will be rotated to bring the end of the drill 34 to bear upon the pipe. The end of drill 34 presses upon the pipe and pulls upon the yoke and the locking plate 22 in the same manner above described to firmly lock and anchor the parts upon the pipe 10. The shaft 32 may then be rotated by means of a wrench or other tool seated on the end 40 of the shaft, and the tube 36 may be simultaneously rotated. In this manner, the necessary tapered opening in the pipe 10 may be formed by drill 34 and reamer 33.

When the proper tapered opening has been formed in pipe 10, it is possible to remove the drilling apparatus as a unit by unthreading the cylinder 30 from the tube 18. The fitting 24 can then be applied to the connector to seat in the tapered opening as above described. The simplicity of the operation of applying and removing the drilling apparatus from the connector, coupled with the ease and speed with which the connector 24 may be applied to the connector, reduces to a minimum any hazard in the operation and also any loss of fluid in the pipe 10. Note that the same clamping action of the connector upon the pipe 10 is obtained during the use of the drilling apparatus as is obtained by the application of fitting 24, and that the mere operation of applying the drilling apparatus to the connector serves to clamp or anchor the connector upon the pipe 10.

I claim:
1. A service connector comprising a yoke adapted to fit around a pipe having an aperture defined by a wall, said yoke having opposed end portions and a central tubular internally screw threaded projection, a locking plate spanning said end portions and slidable thereon parallel to said pipe, said yoke and plate normally fitting loosely around said pipe, and a member threaded in said projection and having an axial bore and an end wall complementary to the wall of said pipe aperture, said end wall having full seal-forming face engagement with said aperture wall and said member and plate pressing inwardly upon said pipe at diametrically opposed points when said member is tightened in said yoke projection.

2. A service connector comprising a yoke adapted to seat on a pipe having a tapered opening, said yoke having a central screw threaded opening and opposed end portions, an anchor plate spanning said end portions and slidable thereon parallel to said pipe, said yoke and plate loosely encircling said pipe, and a tubular fitting threaded in said yoke opening and having an end tapered complementary to and seating in said pipe opening, said fitting pressing at its tapered end against said pipe at said tapered opening to effect a tapered face-engaging sealing interlock between said pipe and fitting and to draw upon said yoke and plate to clamp said pipe between said plate and fitting when said fitting is tightened in said yoke opening.

3. A service connector comprising a yoke adapted to straddle a pipe having an opening therein defined by a smooth tapered wall, a removable locking plate spanning opposite ends of said yoke and cooperating with said yoke to loosely encircle said pipe, said yoke having a central threaded opening, and a tubular fitting having a smooth tapered end wall complementary to the wall of said pipe opening, said fitting being threaded in said yoke opening to press its tapered end into face engagement with the wall of said pipe opening to effect a sealed interlocking joint therewith and to effect a clamping action on said pipe in cooperation with said locking plate.

4. A service connector adapted to seat on a main and to connect a branch in communicating relation to a tapered opening in said main, and having a central threaded opening coaxial with the opening in said main, a locking plate spanning opposite ends of said yoke and cooperating with said yoke to loosely encircle said pipe, and a tubular fitting threaded in said yoke opening and having its inner end tapered complementary to and seating in full face engagement in said tapered main opening, said fitting pressing against said pipe and pulling on said yoke to clamp said pipe between said plate and member and to effect a sealed interlocking joint between the end of said fitting and said main, said fitting having a threaded connection with said branch.

ARTHUR C. MISCH.